United States Patent
Gupta et al.

(10) Patent No.: US 10,535,002 B2
(45) Date of Patent: Jan. 14, 2020

(54) EVENT RESOLUTION AS A DYNAMIC SERVICE

(71) Applicant: INTERNATIONAL BUSINESS MACHINES CORPORATION, Armonk, NY (US)

(72) Inventors: Manish Gupta, New Delhi (IN); Sreekrishnan Venkateswaran, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 867 days.

(21) Appl. No.: 15/054,904

(22) Filed: Feb. 26, 2016

(65) Prior Publication Data
US 2017/0249283 A1    Aug. 31, 2017

(51) Int. Cl.
*G06F 15/18* (2006.01)
*G06N 5/00* (2006.01)

(52) U.S. Cl.
CPC .................... *G06N 5/003* (2013.01)

(58) Field of Classification Search
CPC .................. G06Q 10/06; G06Q 10/103
USPC ....................................... 706/15, 45
See application file for complete search history.

(56) References Cited

U.S. PATENT DOCUMENTS

| | | | |
|---|---|---|---|
| 5,402,478 A * | 3/1995 | Hluchyj | H04Q 3/66 379/115.01 |
| 7,929,429 B2 | 4/2011 | Bornstein et al. | |
| 8,311,878 B2 | 11/2012 | Subramanian et al. | |
| 8,565,409 B1 * | 10/2013 | Croak | H04M 3/5125 370/352 |
| 8,654,963 B2 | 2/2014 | Anisimov et al. | |
| 8,661,454 B2 | 2/2014 | Cole et al. | |
| 8,935,388 B2 | 1/2015 | Tang | |
| 8,935,394 B2 | 1/2015 | Ristock et al. | |
| 2007/0288405 A1 | 12/2007 | Strassner et al. | |
| 2008/0080526 A1 | 4/2008 | Gounares et al. | |
| 2008/0098109 A1 | 4/2008 | Faihe et al. | |
| 2009/0125432 A1 | 5/2009 | Deshpande et al. | |
| 2012/0023044 A1 * | 1/2012 | Anerousis | G06N 5/043 706/12 |
| 2012/0259909 A1 | 10/2012 | Bachelor et al. | |

(Continued)

OTHER PUBLICATIONS

Sengupta, Bikram et al.; Why do You Call? Problem Resolution through Social Compute Units; Proceedings of the 10th International Conference on Service-Oriented Computing (ICSOC 2012); Nov. 12-15, 2012; pp. 48-62.

(Continued)

*Primary Examiner* — David R Vincent
(74) *Attorney, Agent, or Firm* — Schmeiser, Olsen & Watts; Mark C. Vallone

(57) ABSTRACT

An approach is provided for optimally routing events in an IT system to solvers which provide resolutions of the events. Event streams originating from the IT system are defined. Events are classified into the event streams. An optimization problem is solved that minimizes costs incurred for using respective solvers based on constraints which include success rates of the solvers. Based on the solved optimization problem, policies are defined that associate the event streams to the solvers in a many-to-one correspondence. In real time, the defined policies are applied to the event streams. Based on the applied policies and the classified events, the events are routed to respective solvers. An indication is received that the events are resolved by the respective solvers, which reduces downtime in the IT system.

17 Claims, 9 Drawing Sheets

(56) References Cited

U.S. PATENT DOCUMENTS

| | | | |
|---|---|---|---|
| 2012/0323623 | A1 | 12/2012 | Sabharwal |
| 2012/0323640 | A1 | 12/2012 | Sabharwal |
| 2013/0097578 | A1 | 4/2013 | Motoki et al. |
| 2013/0117157 | A1 | 5/2013 | Iyoob et al. |
| 2014/0075318 | A1* | 3/2014 | Cheng ................ H04L 41/0816 715/735 |
| 2016/0155080 | A1* | 6/2016 | Gnanasambandam ...................... G06Q 10/063112 379/265.03 |

OTHER PUBLICATIONS

Deshpande, Prasea M., et al.; Auction Based Models for Ticket Allocation Problem in IT Service Delivery Industry; IEEE International Conference on Services Computing; Jul. 7-11, 2008; pp. 111-118.

SilverSky's Cloud Migration Service; URL: http://cloudmigration.silversky.com; Retrieved from the Internet May 19, 2015; 3 pages.

Server Migration Technology Overview—Racemi; URL: hppt://www.racemi.com/tech-overview; Retrieved from the Internet May 19, 2015; 3 pages.

Cloud Service Provider Peak Published U.S. Patent for Its Innovative Layer 2 "Direct Connect" Network Topology; URL: http://finance.yahoo.com/news/cloud-provider-peak-publishes-u-130200780.html; Retrieved from the Internet May 19, 2015; 4 pages.

Wilkes_Lawrence; Application Migration Patterns for the Service Oriented Cloud; URL: http://everware-cbdi.com/ampsoc; retrieved from the Internet May 19, 2015; 5 pages.

Kelly, Frank; AWS Migration Patterns; URL: http://java.dzone.com/articles/aws-migration-patterns; Retrieved from the Internet May 22, 2015; 10 pages.

* cited by examiner

EVENT RESOLUTION AS A DYNAMIC SERVICE

BACKGROUND

The present invention relates to managing event resolution in an information technology (IT) system, and more particularly to optimally routing an event to one of multiple event resolution vendors.

Traditional event resolution systems include manual activities to resolve a problem that occurred in an information technology (IT) system. Current event resolution techniques employ an expert system between an event management system and an incident problem change system, where the expert system automates some of the activities that were previously performed manually. If the expert system resolves the problem, then no ticket is created in the incident problem change system, but if the expert system cannot resolve the problem, then a ticket is created and manual activities attempt to resolve the problem. Multiple independent software vendors (ISVs) are providing a range of management services in the management-as-a-service arena, including event resolution. Event resolution may be provided by a single service or multiple services belonging to different ISVs. Known techniques for event resolution either utilize the single service or non-optimally select from among the multiple services.

SUMMARY

In a first embodiment, the present invention provides a method of optimally routing events in an IT system to solvers which provide resolutions of the events. The method includes a computer defining event streams originating from the IT system. The method further includes the computer classifying events into the event streams. The method further includes the computer solving an optimization problem that minimizes costs incurred for using respective solvers based on constraints which include success rates of the solvers. The method further includes based on the solved optimization problem, the computer defining policies that associate the event streams to the solvers in a many-to-one correspondence. The method further includes the computer, in real time, applying the defined policies to the event streams. The method further includes based on the applied policies and the classified events, the computer routing the events to respective solvers. The method further includes the computer receiving an indication that the events are resolved by the respective solvers, which reduces downtime in the IT system.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of optimally routing events in an IT system to solvers which provide resolutions of the events. The method includes the computer system defining event streams originating from the IT system. The method further includes the computer system classifying events into the event streams. The method further includes the computer system solving an optimization problem that minimizes costs incurred for using respective solvers based on constraints which include success rates of the solvers. The method further includes based on the solved optimization problem, the computer system defining policies that associate the event streams to the solvers in a many-to-one correspondence. The method further includes the computer system, in real time, applying the defined policies to the event streams. The method further includes based on the applied policies and the classified events, the computer system routing the events to respective solvers. The method further includes the computer system receiving an indication that the events are resolved by the respective solvers, which reduces downtime in the IT system.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of optimally routing events in an IT system to solvers which provide resolutions of the events. The method includes the computer system defining event streams originating from the IT system. The method further includes the computer system classifying events into the event streams. The method further includes the computer system solving an optimization problem that minimizes costs incurred for using respective solvers based on constraints which include success rates of the solvers. The method further includes based on the solved optimization problem, the computer system defining policies that associate the event streams to the solvers in a many-to-one correspondence. The method further includes the computer system, in real time, applying the defined policies to the event streams. The method further includes based on the applied policies and the classified events, the computer system routing the events to respective solvers. The method further includes the computer system receiving an indication that the events are resolved by the respective solvers, which reduces downtime in the IT system.

Embodiments of the present invention employ a brokerage service for servicing event streams provided by an IT system and selecting an optimal event resolution solver from among multiple solvers.

DETAILED DESCRIPTION

Overview

Figure 1:
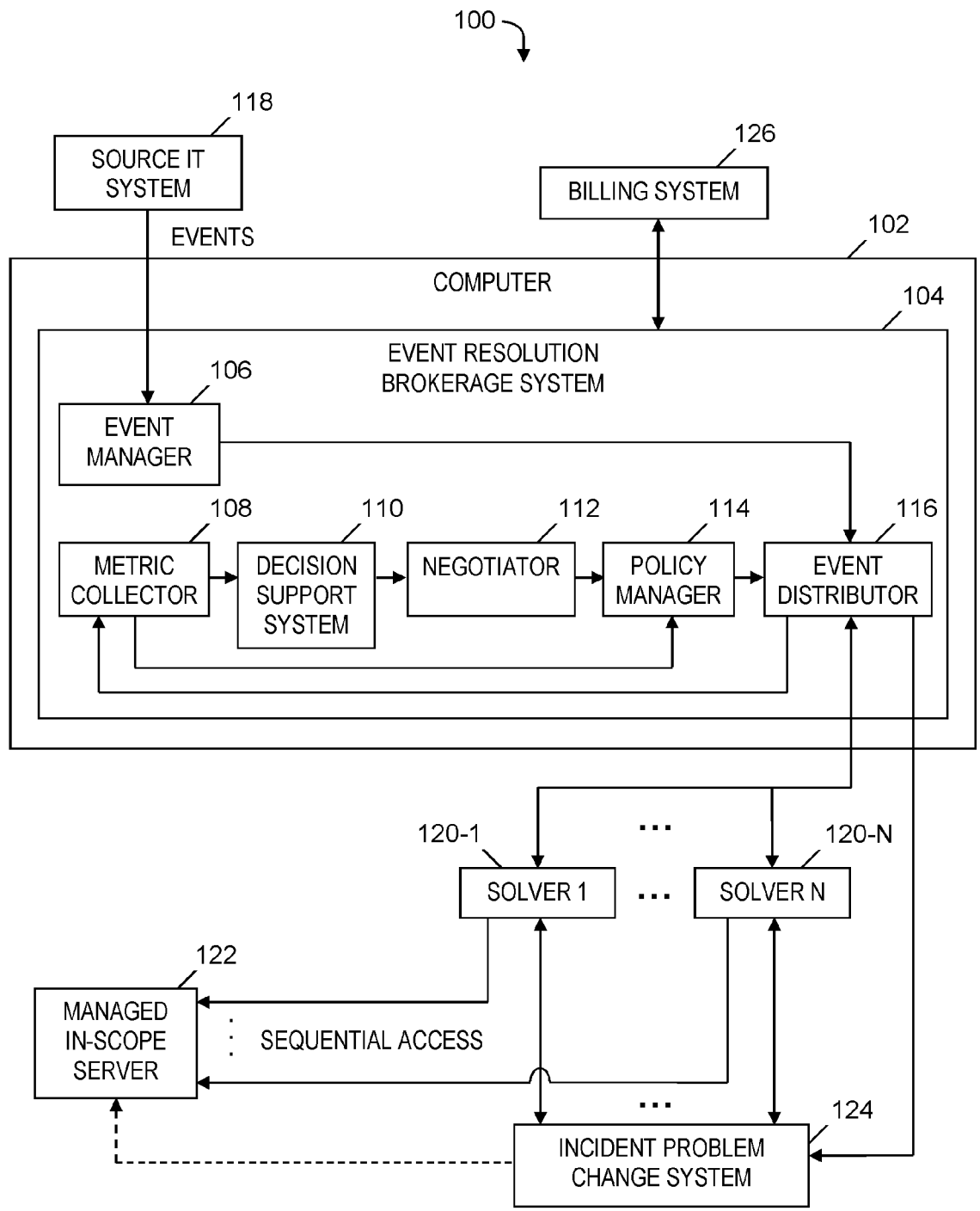
FIG. 1 is a block diagram of a system for optimally routing an event in an IT system to a solver included in a plurality of solvers, in accordance with embodiments of the present invention.

Embodiments of the present invention provide a brokerage service to dynamically and optimally select a solver provided by an event resolution provider from among multiple solvers provided by respective event resolution providers, where the solver is selected to resolve an event in an IT system. The selection of the solver optimizes the utility of an IT service provider who provides the IT system. In one embodiment, the optimization of the utility includes price optimization. Embodiments of the present invention provide an optimal routing of events to a sequence of solvers based on a policy, where the routing of the events through the sequence of solvers continues until a solver is found that successfully resolves the event.

In one embodiment, at least one of the solvers is provided by a third party that is other than the IT service provider who provides the IT system. In one embodiment, multiple event streams are defined and each event stream is assigned to a corresponding one or more solvers for event resolution.

A decision support system (DSS) may determine an event routing policy that includes a new solver provided by a new event resolution provider. In one embodiment, the DSS enables computation of a policy to route events to respective solvers, where the policy includes one or parameters, such as load on the solver, business rating of the solver, security compliance posture of a solver with respect to a customer's requirements, proficiency of a solver, cost of using a solver, and a measured success or failure rate of a solver in solving a type of requests. In one embodiment, the DSS provides Pareto analysis of the feasible solution vectors to determine the policy. Embodiments of the present invention monitor policy parameters, such as price, risk exposure, performance, etc., of a solver, to be used in the DSS to model a new or updated event routing policy. In one embodiment, the performance and capabilities of a solver may be explored by allocating events to the solver despite not satisfying the policy.

Embodiments of the present invention optimize the utility of the end-to-end IT service provider that provides the IT system, subject to constraints to set the policy. The utility may be based on one or more parameters, such as a total payout to the solvers and the cost incurred internally in solving the events; a total penalty paid to the end customer due to not meeting service level objectives (SLOs); a cumulative risk of choosing the multiple solvers; etc. The event routing policy can be set based on various granularities of events to be routed to a solver, as well as through a solution of an optimization problem that optimizes the utility of the end-to-end IT provider.

As used herein, a solver is defined to be a software-based event resolution system that employs robotic process automation or an expert system to resolve events. As used herein, an event is defined to be a significant occurrence that happens at a particular place and time in an IT system. In one embodiment, each event is an incident. As used herein, an incident is defined as an event that is not part of the standard operation of a service provided in the IT system, and that causes or can cause a disruption to or a reduction in the quality of the service. For example, an event or incident in a server may be indicated by a "log full" or "file system not accessible" condition.

System for Optimally Routing Events to Solvers

FIG. 1 is a block diagram of a system for optimally routing an event in an IT system to a solver included in a plurality of solvers, in accordance with embodiments of the present invention. System 100 includes a computer 102 which executes a software-based event resolution brokerage system 104, which includes the following software modules: event manager 106, metric collector 108, decision support system (DSS) 110, negotiator 112, policy manager 114, and event distributor 116.

System 100 also includes a source IT system 118, which is a managed system in which events occur. Source IT system 118 includes software and hardware. Event manager 106 defines event streams, receives specifications of events from source IT system 118, and classifies events from source IT system 118 into respective event streams. Each event from source IT system 118 is classified into exactly one event stream.

Event manager 106 sends each event received from source IT system 118 to event distributor 116. Event distributor 116 receives policies from policy manger 114. Based on the received policies, event distributor 116 optimally routes each event to a corresponding solver included in solver 120-1, . . . , solver 120-N, where N is an integer greater than or equal to two. The policies received by event distributor 116 specify the solvers to which event distributor 116 routes the events.

Each of solvers 120-1, . . . , 120-N executes on a corresponding computer (not shown), which may be a computer included in source IT system 118 or a computer external to source IT system 118 and controlled by a third party (i.e., an entity different from the entity who controls source IT system 118).

In one embodiment, a policy specifies an order in which event distributor 116 sends an event to a first solver and then to one or more other solvers, in case the first solver cannot successfully resolve the event. For example, a policy may specify that event distributor 116 sends an event to Solver A, and if Solver A cannot resolve the event, then sends the event to Solver B, and if Solver B cannot resolve the event, sends the event to Solver C. In one embodiment, the policies are a set of tuples that implement conditional rules.

Metric collector 108 retrieves statistics about events previously distributed by event distributor 116 to corresponding solvers included in solver 120-1, . . . , 120-N. Metric collector 108 retrieves the aforementioned statistics from a data repository (not shown) populated by event distributor 116. In embodiments of the present invention, the retrieved statistics include a combination of the following metrics: duration (i.e., the amount of time a solver takes to resolve an incident correctly), the mean of durations, the variance of durations, the percentage of incidents a solver solved correctly, and the percentage of incidents a solver solved incorrectly. Metric collector uses the retrieved statistics to generate ratings of solvers 120-1, . . . , 120-N, where each rating indicates how well the solver corresponding to the rating is able to resolve incidents.

DSS 110 defines new event streams and the rate of events by using conditional or Boolean expressions. DSS 110 receives and models input parameters, which include the aforementioned statistics from metric collector 108. DSS 110 also defines decision variables. Based on the event streams, input parameters, and decision variables, DSS 110 generates policies that map event streams to solvers 120-1, . . . , 120-N. The mapping of event streams to the solvers specifies to which solver event distributor 116 routes an event. In one embodiment, DSS 110 receives the event stream definitions and the associations between the solvers and the event streams, and generates policies in which stream i is associated with solver j for all $0 \le i < M$ and $0 \le j < N$, where M is the total number of event streams and N is the total number of solvers. The DSS can also change one or more of the generated policies in real time.

DSS 110 defines and models constraints, which are generated from the DSS 110 and which are specified by custom mappings of event streams to solvers 120-1, . . . , 120-N based on factors including the skills and success rate of the solvers.

DSS 110 defines and models objectives that are optimized. For example, an objective is to have the resolution of an event by a particular solver minimize a cost, which includes an amount of money paid as a penalty for not meeting terms of a service level agreement (SLA) and an amount of money paid to the vendor for providing the solver that resolves the event. Other objectives may include minimizing duration or security compliance risk, or maximizing a customer satisfaction score.

Based on the modeled objectives and the constraints, DSS 110 compares different policies based on costs of the policies, determines an optimal policy based on the policy that minimizes cost, and/or performs Pareto analysis to determine Pareto dominance and selects a solver from solvers 120-1, . . . , 120-N that best satisfies conflicting objectives.

In one embodiment, to determine the optimal policy, DSS 110 generates and solves a linear programming problem which minimizes a cost incurred for using each of solvers 120-1, . . . , 120-N based on the constraints.

After generating a new policy, DSS 110 sends the policy to negotiator 112, which terminates existing contracts with the event resolution providers of solvers 120-1, . . . , 120-N in response to a contract expiring, notifies the event resolution providers of the solvers about the new policy, requests that the event resolution providers agree to the policy and the payment mechanism associated with the policy. Negotiator 112 performs the aforementioned contract termination, notifications, and requests for agreements to a policy by communicating with the event resolution providers via software-based negotiation agents (not shown) coupled to respective solvers 120-1, . . . , 120-N. If the event resolution providers of solvers 120-1, . . . , 120-N agree with the policy, then negotiator 112 receives agreements to the policy from the event resolution providers of solvers 120-1, . . . , 120-N. Negotiator 112 notifies policy manager 114 about the contract terminations, notifications of the event resolution providers, and policy agreements made by the event resolution providers of the solvers.

Policy manager 114 receives the policy from negotiator 112, where the policy had been generated by DSS 110 and had been agreed upon by event resolution providers of solvers 120-1, . . . , 120-N and applies the policy to events received from source IT system 118 in real time. Policy manager 114 also receives the solver ratings from metric collector 108. Based on the policy and the solver ratings, policy manager 114 determines the order in which solvers 120-1, . . . , 120-N receive the event from event distributor 116 or from a solver in a prior position in the aforementioned order (i.e., determine (1) which of the solvers is the first solver to attempt to resolve the event received from event distributor 116, (2) if the first solver fails to resolve the event, which of the other solvers is the second solver to attempt to resolve the event, where the second solver receives the event from the first solver, (3) if the second solver fails to resolve the event, which of the other solvers (i.e., other than the first and second solvers) is the third solver to attempt to resolve the event, where the third solver receives the event from the second solver, (4) etc.).

Based on policy manager 114 applying the policy, event resolution brokerage system 104 optimally routes the event in a sequence to solvers 120-1, . . . , 120-N.

The solver ratings provide policy manager 114 with information about different capabilities of the different solvers which cause one solver to be better at resolving a particular type of event than other solvers. For example, Solver A specializes in resolving events that are storage events and is therefore better at resolving storage event XYZ than other solvers. As another example, Solver B may specialize in resolving events that are network events and is therefore better at resolving a network event ABC than other solvers.

After policy manager 114 applies the policy and event distributor 116 distributes the event to solvers 120-1, . . . , 120-N in the order specified by policy manager 114, solvers 120-1, . . . , 120-N access a managed in-scope server 122 in a sequence determined by the order specified by policy manager 114, until one of the accesses of managed in-scope server 122 successfully resolves the event. In-scope server 122 is the component of source IT system 118 which is the source of the problem associated with the event. In another embodiment, managed in-scope server 122 is replaced with another infrastructure component of source IT system 118 which is the source of an event and is sequentially accessed by solvers 120-1, . . . , 120-N to resolve the event.

If none of solvers 120-1, . . . , 120-N is able to successfully resolve the event, then event distributor 116 receives a first indication that none of the solvers was successful, and in response to the receipt of the first indication, sends a second indication to an incident problem change system 124. In response to receiving the second indication, incident problem change system 124 cuts a ticket for the problem associated with the event and places the ticket in a queue. A dispatcher (not shown) dispatches tickets from the queue to human system administrators (not shown) who manually analyze the ticket and access managed in-scope server 122 to attempt to resolve the event.

System 100 includes a software-based central authority (not shown) which receives requests from solvers 120-1, . . . , 120-N to access configuration items (CIs) of source IT system 118. The central authority serializes access and grants access permissions to solvers 120-1, . . . , 120-N to address race conditions and avoid consistency challenges that would occur if two solvers were attempting to access the same CI to resolve respective event stream incidents (e.g., the solvers are working on separate event streams emanating from the same server computer in source IT system 118).

As a first solver attempts to resolve an event it may make changes to configuration items (Cis) which results in a new state in the source IT system 118. This new state may not be acceptable to the next solver that is next in the sequence of solvers that try to resolve the event if the previous solver cannot resolve the event. To address the possibility of an unacceptable state, before making any CI changes, event resolution brokerage system 104 may record all current values of the Cis and keep a copy of virtual machines (VMs) in virtual environments. If a first solver is unsuccessful in an attempt to resolve an event which changes (i.e., "dirties") the VMs so that the changed VMs are unacceptable to the next solver, then the first solver (1) replaces the dirtied VMs with their saved copies and (2) sets all the CIs to their original values. After the aforementioned (1) and (2) are completed, the first solver then escalates the event back.

In one embodiment, as event distributor routes the event by switching between a first solver and a second solver included in solvers 120-1, . . . , 120-N, event resolution brokerage system 104 determines whether a contract with the first solver is terminated. A billing system 126 generates a bill for the first solver in response to the contract termination, where the bill specifies an amount of money to be paid by the entity managing event resolution brokerage system 104 to the event resolution provider of the first solver. The event resolution providers of the solvers may agree to other pricing models by which billing system 126 computes overall payments to be made to each of the solvers. These pricing models are discussed in more detail in the section presented below entitled Contract Termination and Pricing.

The functionality of the components shown in FIG. 1 is described in more detail in the discussion of FIG. 2A, FIG. 2B, FIG. 3, FIG. 4, FIG. 5, and FIG. 6 presented below.

Figure 2A:
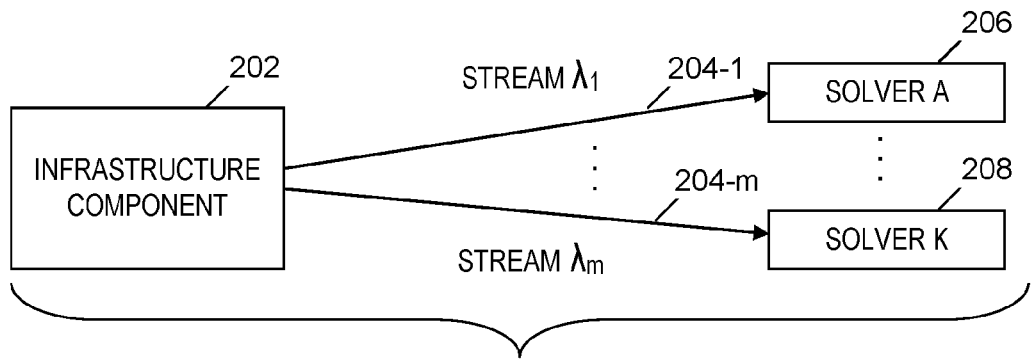
FIG. 2A and FIG. 2B depict event streams specified by an assignment of infrastructure components to solvers included in the system of FIG. 1, in accordance with embodiments of the present invention.
Figure 2B:
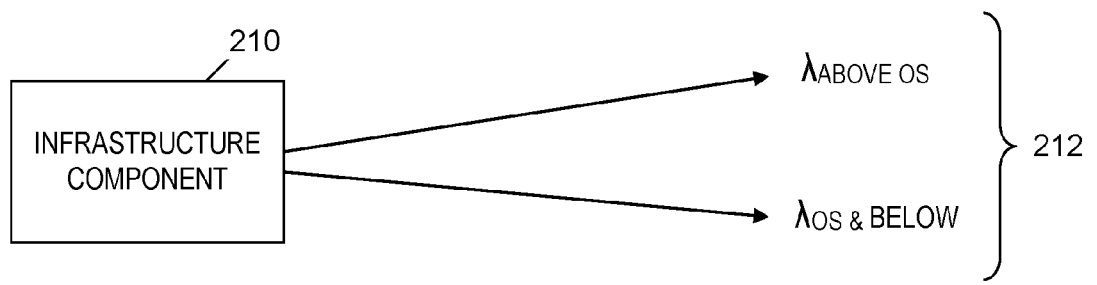
Figure 2B:
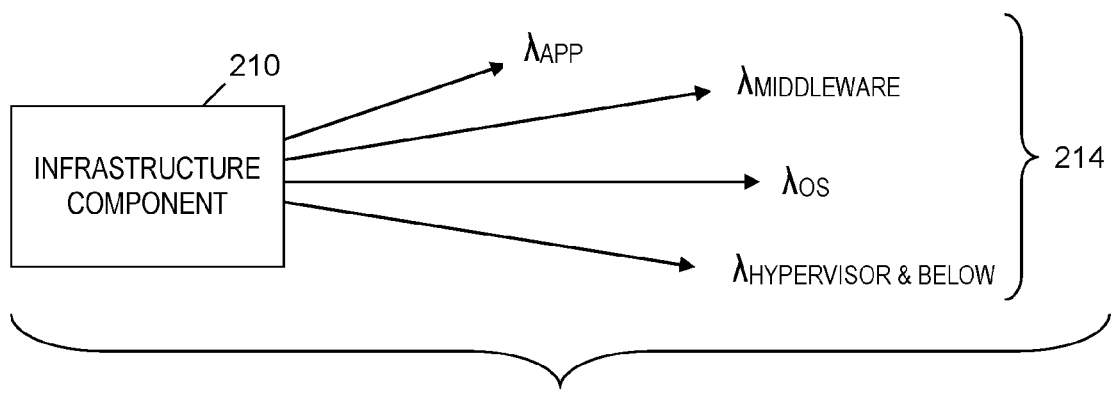

FIG. 2A and FIG. 2B depict examples of event streams specified by assignments of infrastructure components to solvers included in the system of FIG. 1, in accordance with embodiments of the present invention. In FIG. 2A, an infrastructure component 202 is a component of source IT system 118 (see FIG. 1). Event manager 106 (see FIG. 1) defines m event streams: stream 204-1, . . . , stream 204-m (i.e., stream $\lambda_1$, . . . , stream $\lambda_m$), where m is an integer greater than or equal to two. DSS 110 (see FIG. 1) assigns each of the streams 204-1, . . . , 204-m to a corresponding one of solver A, . . . , solver K (i.e., solver 206, . . . , solver 208), which are included in solver 120-1, . . . , 120-N in FIG. 1. The multiple solvers 120-1, . . . , 120-N (see FIG. 1) are operating simultaneously. This assignment of event streams to multiple solvers is distinguished from a known event resolution system in which only one solver exists and all events go to that single solver except for events that come from servers which are not registered for the service provided by the event resolution system.

In one embodiment, event manager 106 (see FIG. 1) defines the event streams 204-1, . . . , 204-m to correspond to respective types of infrastructure components, such as software, server, storage, and network infrastructure components. Event manager 106 (see FIG. 1) may further categorize event streams 204-1, . . . , 204-m based on metadata of each event (e.g., metadata specifying a first event stream from a server to include "log full" events and a second event stream from the same server to include "memory leak" events).

In FIG. 2B, infrastructure component 210 is a component of source IT system 118 (see FIG. 1). Event manager 106 (see FIG. 1) defines a first view 212 of event streams from infrastructure 210 as being organized into two sub-categories of events: $\lambda_{above\ OS}$ (i.e., events that occur above the operating system (OS) level, such as events at the middleware level) and $\lambda_{OS\ \&\ below}$ (i.e., events that occur at the OS level or below the OS level, which includes events at the hypervisor, physical server, and network related levels).

In FIG. 2B, event manager 106 (see FIG. 1) also defines a second view 214 of event streams organized by four sub-categories of events: $\lambda_{app}$, $\lambda_{middleware}$, $\lambda_{OS}$, and $\lambda_{hypervisor\ \&\ below}$. The $\lambda_{app}$ sub-category includes events that occur at the application level. The $\lambda_{middleware}$ sub-category includes events that occur at the middleware level. The $\lambda_{OS}$ sub-category includes events that occur at the OS level. The $\lambda_{hypervisor\ \&\ below}$ sub-category includes events that occur at the hypervisor level or below the hypervisor level (e.g., at the physical server level or a network-related level).

In one embodiment, DSS 110 (see FIG. 1) assigns each of the sub-categories in FIG. 2A and FIG. 2B to a corresponding solver included in solver 120-1, . . . , solver 120-N (see FIG. 1), where the solver specializes in resolving the corresponding sub-category of events. That is, in one embodiment, event resolution providers that provide solvers 120-1, . . . , 120-N (see FIG. 1) subscribe to one or more sub-categories of events coming from a server or other infrastructure component.

The same events may be included in two different event streams based on one sub-category of a first view being a subset of another sub-category of a second view. For example, an event in the event stream organized into sub-category $\lambda_{app}$ in view 214 is also included in another event stream organized into sub-category $\lambda_{above\ OS}$ in view 212 because sub-category $\lambda_{app}$ is a subset of sub-category $\lambda_{above\ OS}$ (i.e., an event that occurs at the application level must also be an event that occurs at a level above the OS level).

DSS 110 (see FIG. 1) generates a policy that assigns an s-th event stream $\lambda_s$ included in streams 204-1, . . . , 204-m to an i-th solver included solvers 120-1, . . . , 120-N (see FIG. 1). The policy maps each event stream to exactly one solver. Prior to routing an event in an event stream to a solver that is mapped to the event stream, an event resolution provider who provides the solver agrees to the policy that routes the event.

In one embodiment, the routing of events is also based on the load on the solver that is currently operating.

In one embodiment, event resolution brokerage system 104 accepts a user instruction to violate a policy, which allows an exploration of the effects of using solver(s) other than the solver assigned to a particular event stream.

Process for Optimally Routing Events to Solvers

Figure 3:
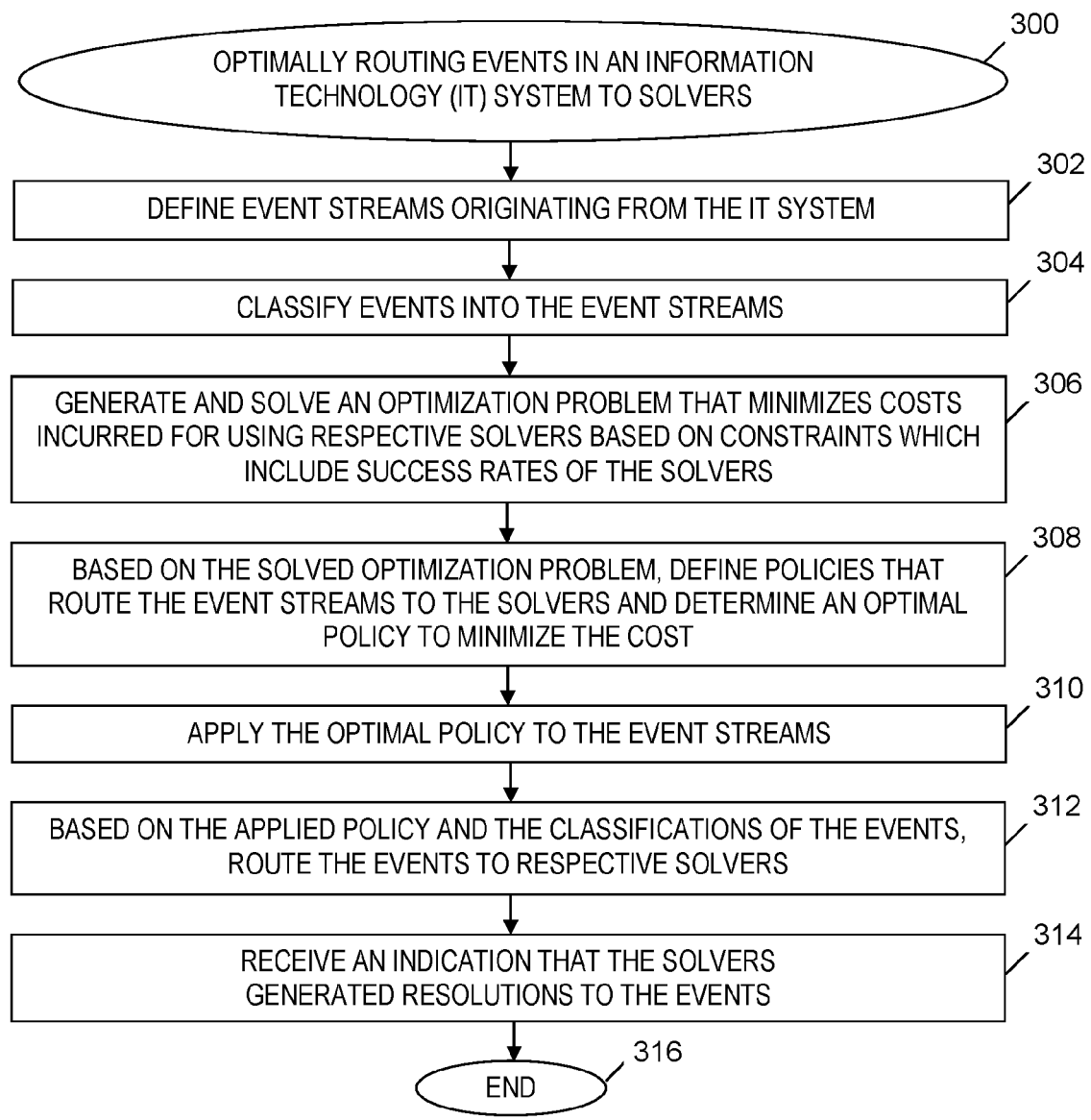
FIG. 3 is a flowchart of a process of optimally routing an event in an IT system to a solver included in a plurality of solvers, where the process is implemented in the system of FIG. 1, in accordance with embodiments of the present invention.

FIG. 3 is a flowchart of a process of optimally routing an event in an IT system to a solver included in a plurality of solvers, where the process is implemented in the system of FIG. 1, in accordance with embodiments of the present invention. The process of FIG. 3 begins at step 300. In step 302, event manager 106 (see FIG. 1) defines event streams that originate from source IT system 118 (see FIG. 1).

In step 304, event manager 106 (see FIG. 1), in real time, classifies events into the event streams defined in step 302. The events classified in step 304 emanate from source IT system 118 (see FIG. 1).

In step 306, DSS 110 (see FIG. 1) defines and models constraints for an optimization problem that minimizes costs incurred for using respective solvers 120-1, . . . , 120-N (see FIG. 1) and for using incident problem change system 124 (see FIG. 1). The constraints include success rates of the solvers 120-1, . . . , 120-N (see FIG. 1) (i.e., the rates of successfully resolving events of classifications into which events are classified in step 304). Also in step 306, based in part on the constraints, DSS 110 (see FIG. 1) generates and determines a solution to the optimization problem to determine the aforementioned costs. In one embodiment, a cost determined by solving the optimization problem includes an amount of money paid as a penalty for not meeting terms of a SLA plus an amount of money paid to an event resolution provider for providing the solver that resolves the event. A solution to a mixed integer nonlinear programming problem to determine the cost that includes the penalty for not meeting terms of a SLA and the cost for using the solvers is described below in the section entitled Optimization Problem. In other embodiments, DSS 110 (see FIG. 1) may generate and solve a linear optimization problem in step 306 to minimize duration or minimize security compliance risk.

In alternate embodiments, step 306 includes DSS 110 (see FIG. 1) defining and modeling constraints for optimization of other linear objective functions, such as (1) maximizing a score indicating customer satisfaction, (2) maximizing up time for the managed applications provided by managed in-scope server 122 (see FIG. 1), (3) maximizing the number of events successfully resolved by solvers 120-1, . . . , 120-N (see FIG. 1) or minimizing the number of events resolved by a local incident management process performed by incident problem change system 124 (see FIG. 1), (4) minimizing the maximum security risk from an individual solver, (5) maximizing a reputation of a solver, where the reputation may be obtained from the sentiment of the solver on social networking sites, and (6) minimizing the penalty due to not meeting an SLO associated with the event.

In step 308, based on the solution to the optimization problem determined in step 306, DSS 110 (see FIG. 1) defines and compares policies, which are conditionals on which the event streams defined in step 302 are routed to respective solvers 120-1, . . . , 120-N (see FIG. 1). The defined policies associate the event streams to solver 120-1 (see FIG. 1), . . . , solver 120-N (see FIG. 1) in a many-to-one correspondence (i.e., each solver is associated with one or more event streams and each event stream is associated with exactly one solver).

For example, a first policy and a second policy may be defined in step 308 as follows:

First policy:
$\lambda_{11}$: All events from Event Management to Solver A
$\lambda_{12}$: If an event cannot be solved by Solver A, then send the event to incident problem change system 124 (see FIG. 1)

Second policy:
$\lambda_{21}$: If an event is from server xxx.xxx.xxx.xx/aa, then send the event to Solver A
$\lambda_{22}$: If an event is from servers yyy.yyy.yyy.yy/bb, then send the event to Solver B
$\lambda_{23}$: If Solver A cannot solve an event, then send the event to Solver B
$\lambda_{24}$: If Solver B cannot solve an event, then send the event to incident problem change system 124 (see FIG. 1)

In one embodiment, in step 308, based on the comparison of the policies, DSS 110 (see FIG. 1) determines that one of the compared policies is an optimal policy that minimizes the aforementioned cost for different classifications of events. In an alternate embodiment, DSS 110 (see FIG. 1) selects a solver from solvers 120-1, . . . , 120-N (see FIG. 1) that best satisfies conflicting objectives based on a Pareto analysis.

In step 310, event manager 106 (see FIG. 1) applies the optimal policy defined in step 308 to the event streams.

In step 312, based on the optimal policy applied in step 310, event distributor 116 (see FIG. 1) in real time routes the events to respective solvers included in solver 120-1 (see FIG. 1), . . . , solver 120-N (see FIG. 1).

After step 312 and prior to step 314, the solvers to which events were routed in step 312 generate resolutions to the events. Although not shown in FIG. 3, if none of the solvers can resolve an event, the event resolution brokerage system 104 (see FIG. 1) sends the event to incident problem change system 124 (see FIG. 1), which cuts a problem ticket to prompt a system administrator to attempt to resolve the event.

In step 314, event resolution brokerage system 104 (see FIG. 1) receives an indication that the solvers generated resolutions to the events. The process of FIG. 3 ends at step 316.

Events that indicate problems with the infrastructure of source IT system 118 (see FIG. 1) are resolved more quickly under the process of FIG. 3 implemented in system 100 (see FIG. 1), as compared to resolving the same events using known event resolution techniques. By its quicker resolution of infrastructure problems, completing the process of FIG. 3 as implemented system 100 (see FIG. 1) reduces downtime of hardware included in and software managed by source IT system 118 (see FIG. 1).

Contract Termination and Pricing

As events are routed to solvers in the process of FIG. 3, event resolution brokerage system 104 (see FIG. 1) determines when a contract with an event resolution provider of a solver is terminated. An IT service provider providing event resolution brokerage system 104 (see FIG. 1) can distribute or switch between event resolution providers of solvers at different granularities, as presented below.

Per time-block of events: event resolution brokerage system 104 (see FIG. 1) routes events over a time-block (i.e., block of time) to an event resolution provider based on a predetermined policy. A block of time may be of the order of minutes, hours, days, months, etc. In response to the time-block being completed, the duration of the contract is completed. This time-block is denoted by T in the pricing functions described below.

Per event: Each event corresponds to a task to be performed to solve the incident associated with the event. Each event can be resolved by a different corresponding solver. The IT service provider may decide to forward no more events to the corresponding solver subsequent to any event being forwarded to the solver. The pricing functions described below use $J(i, t, \lambda_s)$ to denote the events successfully processed by solver i by time t since directing a stream $\lambda_s$ to Solver i and $H(i, t, \lambda_s)$ to denote the events unsuccessfully processed by solver i by time t since directing a stream $\lambda_s$ to Solver i.

Per count of events: After event resolution brokerage system 104 (see FIG. 1) routes a fixed number of events to a solver, the contract with the event resolution provider of the solver expires.

In one embodiment, there is a cost associated with each time a contract with an event resolution provider is terminated and a new contract is created. This cost can be modeled as a fixed time cost, F. The contract with the event resolution provider can be renewed automatically if there is no change in the contract and the consumer does not commit to the ending of the contract.

The pricing function is denoted by f( . . . ). Billing system 128 (see FIG. 1) uses this pricing function to compute the overall payment to be made to each of the solvers 120-1, . . . , 120-N (see FIG. 1). Alternatively, the charges can be sent by the event resolution providers of the solvers.

Event resolution brokerage system 104 (see FIG. 1) associates a pricing model with each event stream to which a solver is subscribed. Examples of pricing models are presented below.

Fixed fee per time duration (e.g., monthly) for a specified infrastructure component:

$F(\lambda_s, i, T) := p_i$ per time T.

Number of software robots with a price per robot per duration:

Event resolution brokerage system 104 (see FIG. 1) chooses the number of software robots, n, based on the expected workload.

$f(\lambda_s, i, n, T) := p_i * n$ per T time $f(\lambda_s, i, n, J, H) := p_i * n$ per J events$+q_i$ Per port pricing: Use the formulas presented above in the number of software robots pricing model, except that n is the number of ports.

Per event pricing: All the events that are resolved correctly are charged a price p while a flat rate q for all the events that could not be successfully resolved:

$f(\lambda_s, i, j_i, h_i) := p_i * j_i + q_i(h_i)$

Customized tiered pricing

Utility models of pricing: The event resolution provider determines charges that are based on the utilization of the managed infrastructure.

Optimization Problem

In one embodiment, step 306 (see FIG. 3) includes DSS 110 (see FIG. 1) determining a cost which includes the cost of using the solvers 120-1, . . . , 120-N (see FIG. 1) plus the penalty of not meeting the terms of the SLA. DSS 110 (see FIG. 1) determines the aforementioned cost by generating and solving a mixed integer nonlinear programming (MINP) problem. The MINP problem uses the following notation:

$\lambda$ is the total arrival rate of events from the managed infrastructure in source IT system 118 (see FIG. 1).

$\lambda_{ms}$ is defined so that the first index $m \in \{0, 1, \ldots, K\}$ corresponds to which solver the event stream is emanating from, the second index $s \in \{1, \ldots, S\}$ corresponds to the event stream index itself, m=0 corresponds to the all the streams of events directly coming from the infrastructure, m>0 corresponds to the solvers shown in FIG. 1, $\lambda_{ms}$ is the $s^{th}$ unresolved event stream coming out of solver m, and m=K corresponds to a native in-house IT department (which includes incident problem change system 124 (see FIG. 1)) solving an event that is unsolved by the solvers and thus in this case, by definition, there are no streams emanating from the in-house IT department. As used in this Optimization Problem section, the IT department is a department of an end-to-end service provider that provides event resolution brokerage system 104 (see FIG. 1).

$\lambda_{0s}$ indicates all the streams which are directly coming from the infrastructure. In this case, there are S streams.

The aforementioned notations indicate the possibility that two different streams may have overlapping events. For example, $\lambda_{APP}$ in the second view 214 in FIG. 2B and $\lambda_{ABOVE\_OS}$ in the first view 212 in FIG. 2B have overlapping events because $\lambda_{APP}$ is included in $\lambda_{ABOVE\_OS}$.

Subsets of the streams from the infrastructure are created such that all the event streams in each subset cover all the events coming from the infrastructure. These subsets are defined through the constants $Z_{gs}$. $Z_{gs}$ is 1 if s belongs to the $g^{th}$ subset, otherwise $Z_{gs}$ is 0. Note that $\Sigma_{g,s} Z_{gs} = S$; i.e., for any given subset g, $\Sigma_s \lambda_{0s} Z_{gs} = \lambda$ (i.e., the total stream strength coming out of the managed infrastructure). The first view 212 (see FIG. 2B) includes a first example of a subset of streams. The second view 214 (see FIG. 2B) includes a second example of a subset of streams.

Because m=K indicates the native in-house IT department solving any unresolved event, $\lambda_{Ks}$ is 0 to indicate there are no streams emanating from the in-house IT department.

$x_{msi} = 1$ if $\lambda_{ms}$ stream is assigned to Solver I; otherwise $x_{msi} = 0$. Note that i>0. $x_{msi}$ is an unknown in the optimization problem. The optimization problem is used to solve for $x_{msi}$.

In a solution to the optimization problem, only the streams within a subset (as described above) are assigned to solvers and other subsets are discarded. To ensure that only the streams within a single subset are selected in the solution of the optimization problem, the following constraints are needed in the optimization problem:

(1) $\Sigma_{s,g,i} \lambda_{0s} Z_{gs} x_{0si} = \lambda$, which indicates that the optimization problem needs to cover all the events that are sent to the solvers from the managed infrastructure.

(2) For each of the subsets g, add the following inequalities $x_{0si} \geq \Sigma_i \Sigma_s Z_{gs} x_{0si}/S$, where the rationale is if the right hand side of each inequality in (2) is greater than 0, then each of the variables $x_{0si}$ within a single subset is driven to 1, and as a consequence of the equality in (1), forcing all the others to 0.

All the other streams which are emanating from the actual solvers (i.e., m>0) are assigned to any other solver including m=K. The $K^{th}$ solver is the native in-house IT department (i.e., the end-to-end service provider's IT department itself). $x_{msm} = 0$ to indicate that there is no point in assigning a stream to the solver from which the stream has emanated.

In the optimization problem, a model of the penalty incurred by the end-to-end service provider in case terms of a SLO are missed is described below.

$P(\lambda_{ms}, T_j, u_j)$ denotes the penalty rate (e.g., penalty incurred per second expressed as a number of dollars per second) that is input into DSS 110 (see FIG. 1) for criticality level j if the target service level $T_j$ is missed. Note that $T_j$ is a time limit to resolve an event according to the terms of an SLO and depends on $\lambda_{ms}$, as described below. Note that m=0, given that all other streams where m>0 are derivatives of streams with m=0 (i.e., initial event streams emanating from a managed infrastructure are mapped to respective solvers, and if a particular solver cannot resolve an event in an event stream, then the event is passed to a next solver in a subsequent stream that is a derivative of the initial stream emanating from the managed infrastructure).

$C_{msj}$ is the percentage of events in stream $\lambda_{ms}$ that have criticality level j, where $j \in \{0, 1, 2, \ldots, L\}$. $C_{msj}$ is based on historical data and is an input to DSS 110 (see FIG. 1).

$U_{msji}$ is the percentage of events of criticality level j in $C_{msj} \lambda_{ms}$ that could not be resolved in the stipulated time when $x_{msi} = 1$. $U_{msji}$ is an input to DSS 110 (see FIG. 1).

$u_j$ is the percentage of total events of criticality j that could not be resolved in the stipulated time and equals $\Sigma_{m,s,i} U_{msji} C_{msj} \lambda_{ms} x_{msi}/\Sigma_{m,s,j,i} U_{msji} C_{msj} \lambda_{ms} x_{msi}$ $T_j$ is the service level target for events of criticality j. $T_j$ is an input to DSS 110 (see FIG. 1) and is the aforementioned stipulated time.

As an example, consider a Solver A receiving multiple streams $\lambda_{mx}$, $\lambda_{ny}$, and $\lambda_{lz}$ which emanate from other respective solvers. Two event streams $\lambda_{as}$ and $\lambda_{at}$ emanate from Solver A that include events that Solver A cannot resolve. Event stream $\lambda_{as}$ is received by Solver C and event stream $\lambda_{at}$ is received by Solver B. DSS 110 (see FIG. 1) generates the mapping that routes the event streams from Solver A to Solvers B and C. In this example, the rate of successfully resolved events from Solver A is expressed as $j_a := \Sigma_{m,s} \lambda_{ms} x_{sa} - \Sigma_s \lambda_{as}$ (i.e., the total input minus what Solver A sends out to other solvers equals the rate of successfully resolving events by Solver A). Furthermore, all events into a K-th solver are by definition resolved, which is expressed as $\Sigma_s \lambda_{Ks} = 0$.

In determining a cost of using solvers, DSS 110 (see FIG. 1) uses an assumption that all the solvers, without loss of generality, use the per-event pricing (i.e., each solver charges for an event that it has been able to successfully resolve and does not charge for an event that it has not been able to successfully resolve). DSS 110 (see FIG. 1) then determines the total payout rate as:

$$\Sigma_{i>0} f(\lambda_{ms}, i, j_i, h_i) = \Sigma_{i>0} p_i * j_i + q_i, \text{ where:}$$

i is the index of the $i^{th}$ solver; $\lambda_{ms}$ is the $ms^{th}$ stream that is assigned to i (m≠i); and $j_i$ is the rate of successfully resolved events and $h_i$ is the rate of unsuccessfully resolved events coming out of solver i in the minimum billing/contract duration;

$p_i$ is the price or cost of processing a successfully resolved event by the solver I;

$q_i$ is the price or cost of sending events to a solver, where those events could not be successfully resolved. This price or cost $q_i$ may depend on $h_i$ but in this determination of the total payout rate, $q_i$ is selected to be a flat rate;

i=0 corresponds to streams coming directly from the managed infrastructure and is thus not considered; and i=K corresponds to the local IT department of the end-to-end service provider and thus $q_K$=0

An example of the objective function generated and solved by DSS 110 (see FIG. 1) for the optimization problem is as follows:

The example objective function (1) may be a linearized function of penalty and cost of using the solvers:

$$a\Sigma_{s=0}^{S}\Sigma_{j=0}^{L}P(\lambda_{0s}, T_j, u_j) + b\Sigma_{m=1}^{K}p_m j_m + q_m \quad (1)$$

The aim is to minimize the objective function presented above subject to the following constraints:

$u_j = \Sigma_{m,s,i} U_{msji} C_{msj} \lambda_{ms} x_{msi} / \Sigma_{m,s,j,i} U_{msji} C_{msj} \lambda_{ms} x_{msi}$ which defines $u_j$ in terms of $x_{si}$;

$\lambda_{00} = \lambda - \Sigma_{m,k>s>0,\, i<K} x_{0si} \lambda_{0s}$ which indicates any remaining events solved by the end-to-end service provider; and $x_{00K}$=1, where $\lambda_{00}$ is assigned to the end-to-end service provider; and including other constraints discussed above.

An optimization formulation is presented above using two objective functions in a linear combination. Other objective functions can also be considered in isolation or in a linear combination as presented above.

Heuristic Approach

Figure 4:
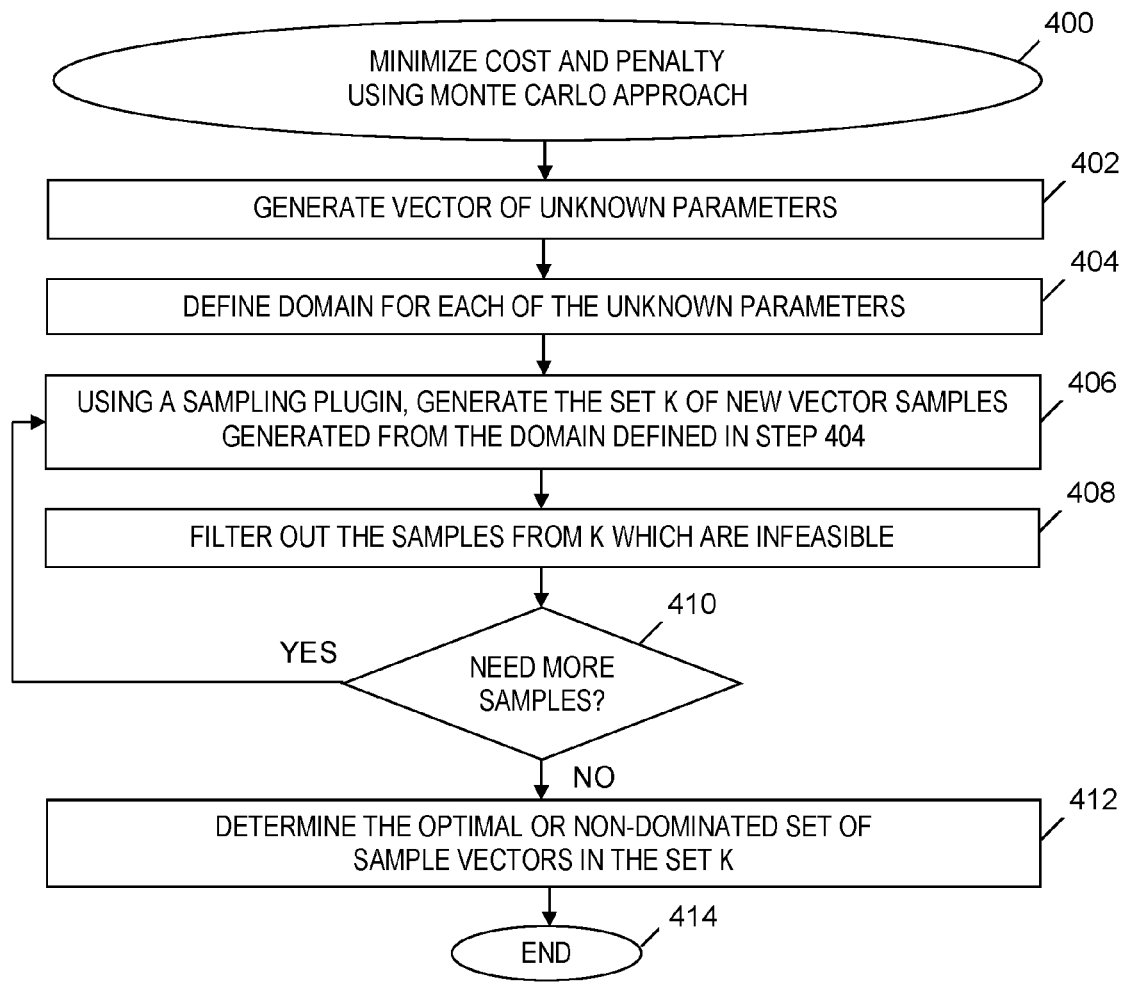
FIG. 4 is a flowchart of a Monte Carlo process of minimizing the cost and penalty of routing an event to a solver in the system of FIG. 1, in accordance with embodiments of the present invention.

In one embodiment, DSS 110 (see FIG. 1) determines a solution to the aforementioned optimization problem (i.e., integer linear programming (ILP), or non-linear programming program) using a heuristic approach (e.g., linear programming relaxation, simulated annealing, Monte Carlo methods, branch and bound, etc.). FIG. 4 is a flowchart of a Monte Carlo process of minimizing the cost and penalty of routing an event to a solver in the system of FIG. 1, in accordance with embodiments of the present invention. In one embodiment, the process of FIG. 4 is included in step 306 (see FIG. 3).

The process of FIG. 4 starts at step 400. In step 402, DSS 110 (see FIG. 1) generates a vector of unknown parameters, which includes $x_{si}$. Again, the value of $x_{si}$ is either zero or one. In step 404, DSS 110 (see FIG. 1) defines a domain for each of the unknown parameters. For example, $x_{si} \in \{0,1\}$, indicating that either the stream is not mapped to the i-th solver or the stream is mapped to the i-th solver.

In step 406, DSS 110 (see FIG. 1) utilizes a sampling plugin to repeatedly and randomly generate sample vectors using the domains defined in step 404 to form a set K of new sample vectors.

In step 408, DSS 110 (see FIG. 1) determines values of objective functions for respective sample vectors in set K formed in step 406, and determines whether each sample vector violates the constraints discussed above relative to objective function (1). If a sample vector violates the constraints, then DSS 110 (see FIG. 1) filters out (i.e., discards) the sample vector from the set K because the sample vector is infeasible; otherwise, DSS 110 (see FIG. 1) keeps the sample vector in set K.

In step 410, DSS 110 (see FIG. 1) determines whether more sample vectors are needed. If DSS 110 (see FIG. 1) determines in step 410 that more sample vectors are needed, then the Yes branch of step 410 is taken, and the process of FIG. 4 loops back to step 404 to generate more sample vectors.

If DSS 110 (see FIG. 1) determines in step 410 that no more sample vectors are needed, then the No branch of step 410 is taken and step 412 is performed.

In one embodiment, DSS 110 (see FIG. 1) graphically plots the sample vectors in set K to assist a user in performing Pareto analysis. In step 412, based on the objective functions corresponding to the sample vectors in set K, DSS 110 (see FIG. 1) determines the optimal set of sample vectors or non-dominated set of sample vectors that are included in set K, thereby determining the vector that minimizes the value of the objective function. The process of FIG. 4 ends at step 414.

Policy Determination

Figure 5:
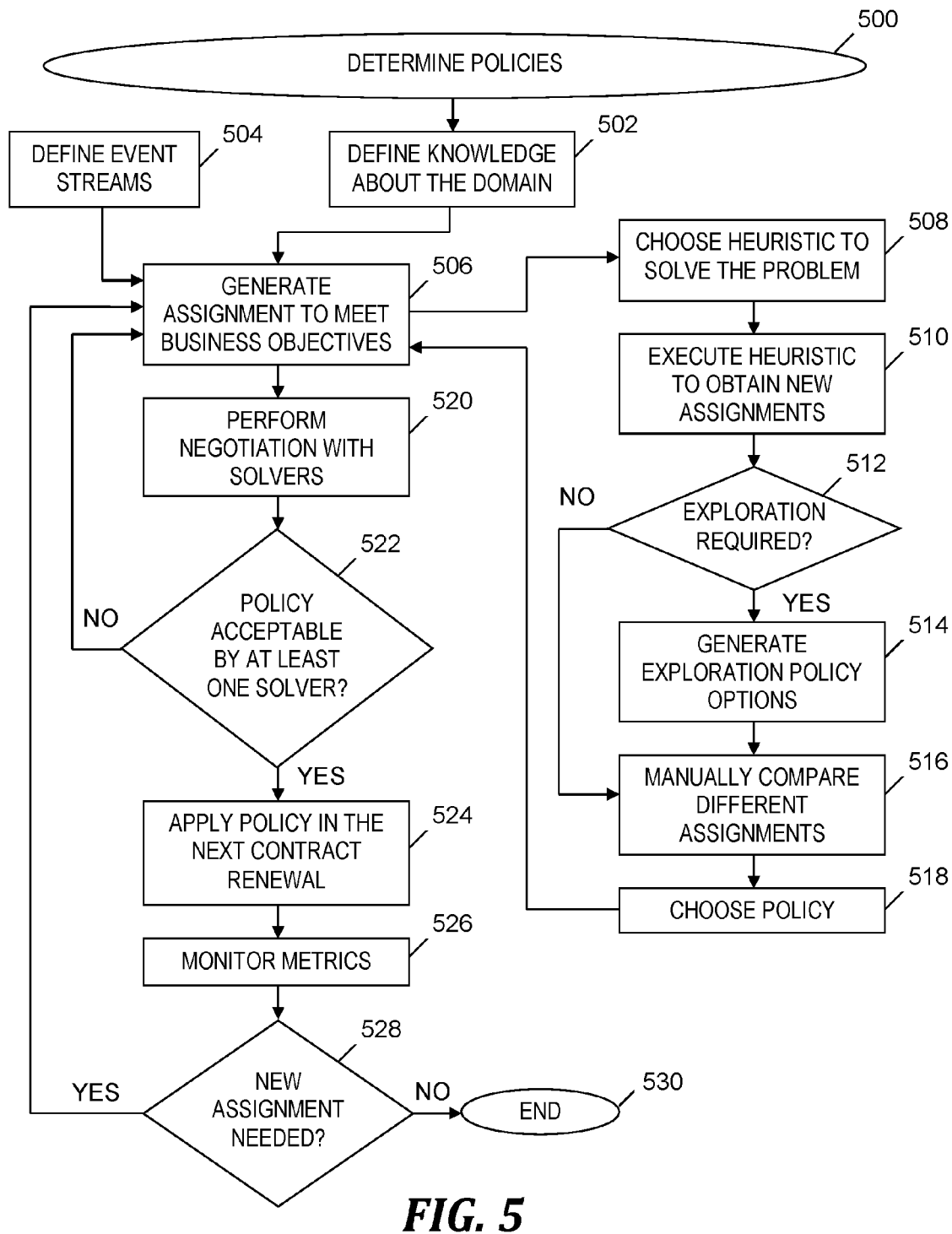
FIG. 5 is a flowchart of a process of determining policies managed by the system of FIG. 1, in accordance with embodiments of the present invention.

FIG. 5 is a flowchart of a process of determining policies managed by the system of FIG. 1, in accordance with embodiments of the present invention. In one embodiment, the process of FIG. 5 is included in step 308 (see FIG. 3). The process of FIG. 5 starts at step 500. In step 502, event resolution brokerage system 104 (see FIG. 1) defines knowledge about a domain as an input to the policy determination process. In step 504, event resolution brokerage system 104 (see FIG. 1) defines event streams as input to the policy determination process In step 506, event resolution brokerage system 104 (see FIG. 1) generates an assignment of a policy to meet business objectives. Step 506 includes steps 508 through 518.

In step 508, event resolution brokerage system 104 (see FIG. 1) chooses a heuristic approach to solve the optimization problem. In step 510, event resolution brokerage system 104 (see FIG. 1) executes the chosen heuristic approach (e.g., the Monte Carlo process in FIG. 4) to obtain new assignments.

In step 512, if event resolution brokerage system 104 (see FIG. 1) determines that exploration is required to choose a policy, then the Yes branch of step 512 is taken and step 514 is performed.

In step 514, event resolution brokerage system 104 (see FIG. 1) generates exploration policy options. In step 516, different assignments are manually compared. In step 518, based on the comparison in step 516, event resolution brokerage system 104 (see FIG. 1) chooses a policy, which is the policy whose assignment is generated in step 506.

Returning to step 512, if event resolution brokerage system 104 (see FIG. 1) determines that exploration is not required to choose the policy, then the No branch of step 512 is taken and step 516 is performed, as described above.

After the generation of the assignment is completed in step 506 along with the policy chosen in step 518, step 520 is performed.

In step 520, event resolution brokerage system 104 (see FIG. 1) performs negotiation with solvers 120-1, . . . , 120-N (see FIG. 1) to accept the policy chosen in step 518.

In step 522, event resolution brokerage system 104 (see FIG. 1) determines whether the policy chosen in step 518 is acceptable to at least one of solvers 120-1, . . . , 120-N (see FIG. 1). If event resolution brokerage system 104 (see FIG. 1) determines in step 522 that the chosen policy is acceptable by at least one of the solvers, then the Yes branch of step 522 is taken and step 524 is performed.

In step 524, event resolution brokerage system 104 (see FIG. 1) applies the policy chosen in step 518 in the next contract renewal for the solver(s) for which the policy is acceptable, as determined in step 522.

In step 526, event resolution brokerage system 104 (see FIG. 1) monitors metrics about whether the solver that accepted the policy is successfully resolving events in a particular event stream. The metrics are collected by metric collector 108 (see FIG. 1).

In step 528, based on the metrics monitored in step 526, event resolution brokerage system 104 (see FIG. 1) determines whether a new assignment of a policy is needed. If event resolution brokerage system 104 (see FIG. 1) determines in step 528 that a new assignment is needed, then the Yes branch of step 528 is taken and the process of FIG. 5 loops back to step 506 to generate a new assignment of a policy. If event resolution brokerage system 104 (see FIG. 1) determines in step 528 that a new assignment is not needed, then the No branch of step 528 is taken and the process of FIG. 5 ends at step 530.

Returning to step 522, if event resolution brokerage system 104 (see FIG. 1) determines that the policy is not acceptable to at least one of the aforementioned solvers, then the No branch of step 522 is taken and the process of FIG. 5 loops back to step 506 to generate another assignment, as described above.

Through the process of FIG. 5, event resolution brokerage system 104 (see FIG. 1) is helping the end-to-end service provider to provide and apply appropriate policies as event resolution brokerage system 104 (see FIG. 1) learns about the capabilities of the solvers and improves estimations of the solvers' capabilities.

Figure 6:
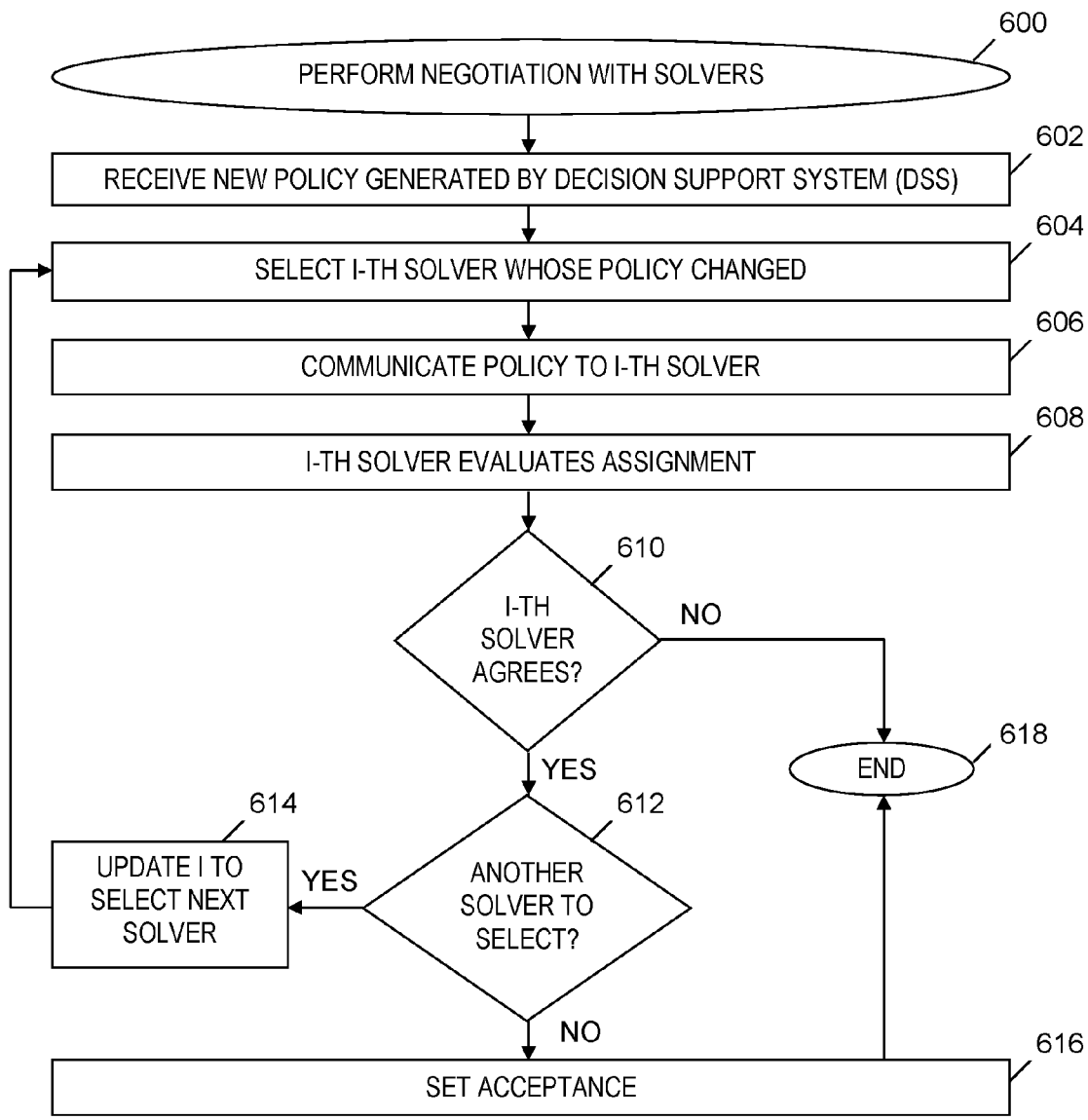
FIG. 6 is a flowchart of a process of performing a negotiation with solvers included in the process of FIG. 5, in accordance with embodiments of the present invention.

FIG. 6 is a flowchart of a process of performing a negotiation with solvers included in the process of FIG. 5, in accordance with embodiments of the present invention. The process of FIG. 6 is included in step 520 (see FIG. 5). The process of FIG. 6 starts at step 600. In step 602, negotiator 112 (see FIG. 1) receives a new policy chosen by DSS 110 (see FIG. 1) in step 518 (see FIG. 5).

In step 604, negotiator 112 (see FIG. 1) selects an i-th solver from solver 120-1, . . . , 120-N (see FIG. 1), where the policy of the i-th solver has changed based on the new policy chosen by DSS 110 (see FIG. 1).

In step 606, negotiator 112 (see FIG. 1) communicates the policy to the i-th solver.

In step 608, the i-th solver evaluates the assignment of the new policy, which has been generated in step 506 (see FIG. 5).

In step 610, negotiator 112 (see FIG. 1) determines whether the i-th solver agrees with the assignment of the new policy. If negotiator 112 (see FIG. 1) determines in step 610 that the i-th solver agrees with the assignment, then the Yes branch is taken and step 612 is performed.

In step 612, negotiator 112 (see FIG. 1) determines whether there is another solver to select from solvers 120-1, . . . , 120-N (see FIG. 1). If negotiator 112 (see FIG. 1) determines in step 612 that there is another solver to select, then the Yes branch of step 612 is taken and step 614 is performed.

In step 614, negotiator 112 (see FIG. 1) updates i to select the next i-th solver include in solvers 120-1, . . . , 120-N (see FIG. 1), and the process of FIG. 6 loops back to step 604 to select the next i-th solver.

Returning to step 612, if negotiator 112 (see FIG. 1) determines that there is not another solver to select, then the No branch of step 612 is taken and step 616 is performed.

In step 616, negotiator 112 (see FIG. 1) sets the acceptance of the solver of the new policy and the process of FIG. 6 ends at step 618.

Returning to step 610, if negotiator 112 (see FIG. 1) determines that i-th solver does not agree to the assignment evaluated in step 608, then the No branch of step 610 is taken and the process of FIG. 6 ends at step 618. In this case, the process continues with a new assignment of a policy in step 506 (see FIG. 5).

Supervised Learning Based Method

In one embodiment, event resolution brokerage system 104 includes a capability optimizer that determines whether a solver has a capability to resolve an event by the following steps:

(1) model the capability of the solver to resolve an event using the capability optimizer function presented below:

$y = ax_1 + bx_2 + cx_3 + dx_4$, where $x_1$ = the category of the problem $x_2$ = the severity of the problem $x_3$ = should_experiment flag indicating whether an exploration of the performance of a solver by allocating events to the solver even though there is a violation of the policy $x_4$ = is_current_solver_for_this_category indicating whether the solver is the current solver for resolving problems in the category a, b, c, and d dynamically evolve based on periodic feedback from a tool in system 100 (see FIG. 1) that produces the status of a resolution of an event and an amount of time taken to resolve the event for each problem assigned to each solver. The a, b, c, and d coefficients are adjusted based on a determination of previous false positives and false negatives.

(2) perform logistic regression using the capability optimizer function described above in step (1). The logistic regression uses past data to improve the next decision. Event resolution brokerage system 104 uses the logistic regression to estimate the coefficients of the capability optimizer function and output whether a particular solver should resolve an event.

(3) if the result of the regression indicates multiple options, then a series of filters are employed using load balancing and cost optimization to reduce the options to only one option. The cost optimization in the series of filters performs linear regression for each solver using a function based on a cost that will be incurred, a slippage penalty, and a risk rating of the solver.

Computer System

Figure 7:
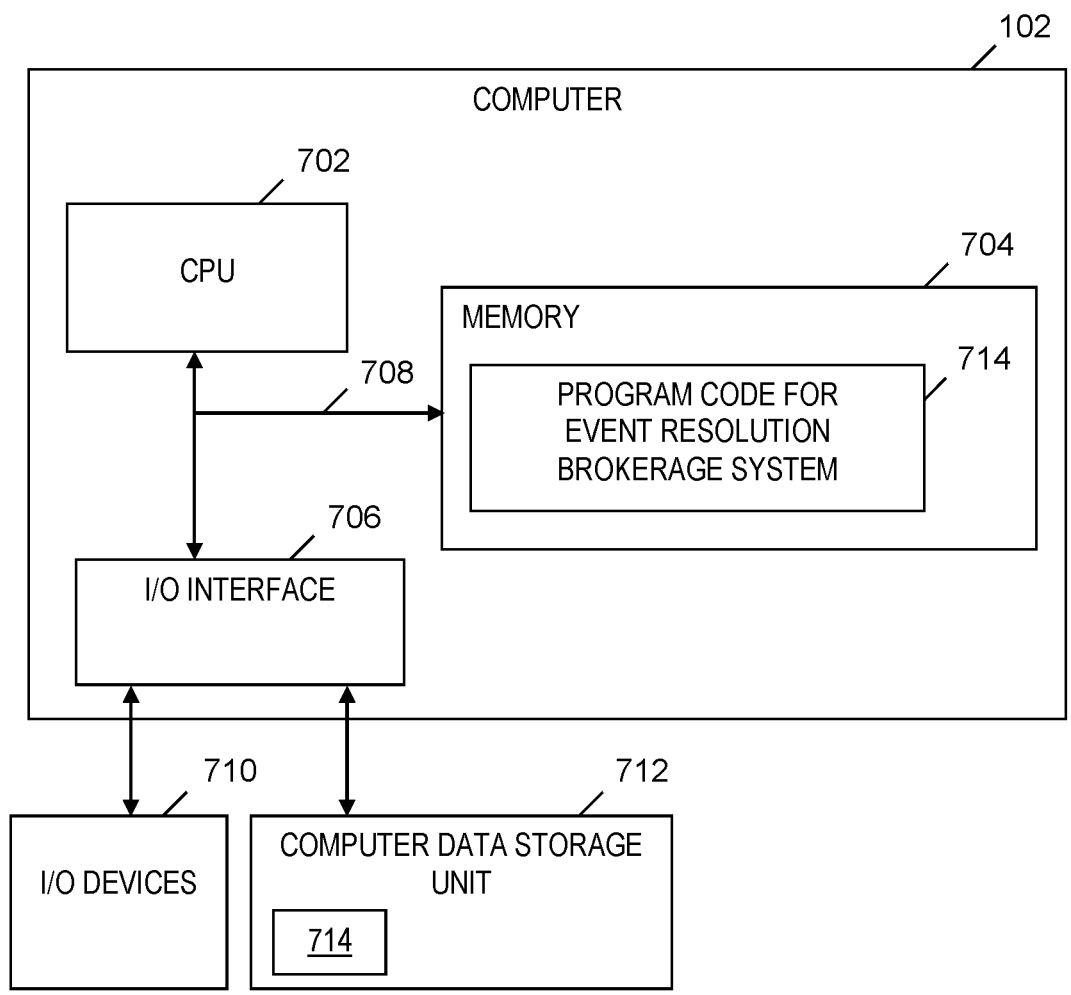
FIG. 7 is a block diagram of a computer that is included in the system of FIG. 1 and that implements the process of FIG. 3, in accordance with embodiments of the present invention.

FIG. 7 is a block diagram of a computer that is included in the system of FIG. 1 and that implements the process of FIG. 3, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for event resolution brokerage system 108 (see FIG. 1) to perform a method of optimally routing events in an IT system to solvers, where the instructions are executed by CPU 702 via memory 704. CPU 702 may include a single processing unit, or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display device, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are executed by CPU 702 via memory 704 to optimally route events in an IT system to solvers. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

Storage unit 712 and/or one or more other computer data storage units (not shown) that are coupled to computer 102 may store any combination of: constraints 114 (see FIG. 1) and policies 110 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimally routing events in an IT system to solvers. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to optimally route events in an IT system to solvers. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimally routing events in an IT system to solvers.

While it is understood that program code 714 for optimally routing events in an IT system to solvers may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of optimally routing events in an IT system to solvers. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 3) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
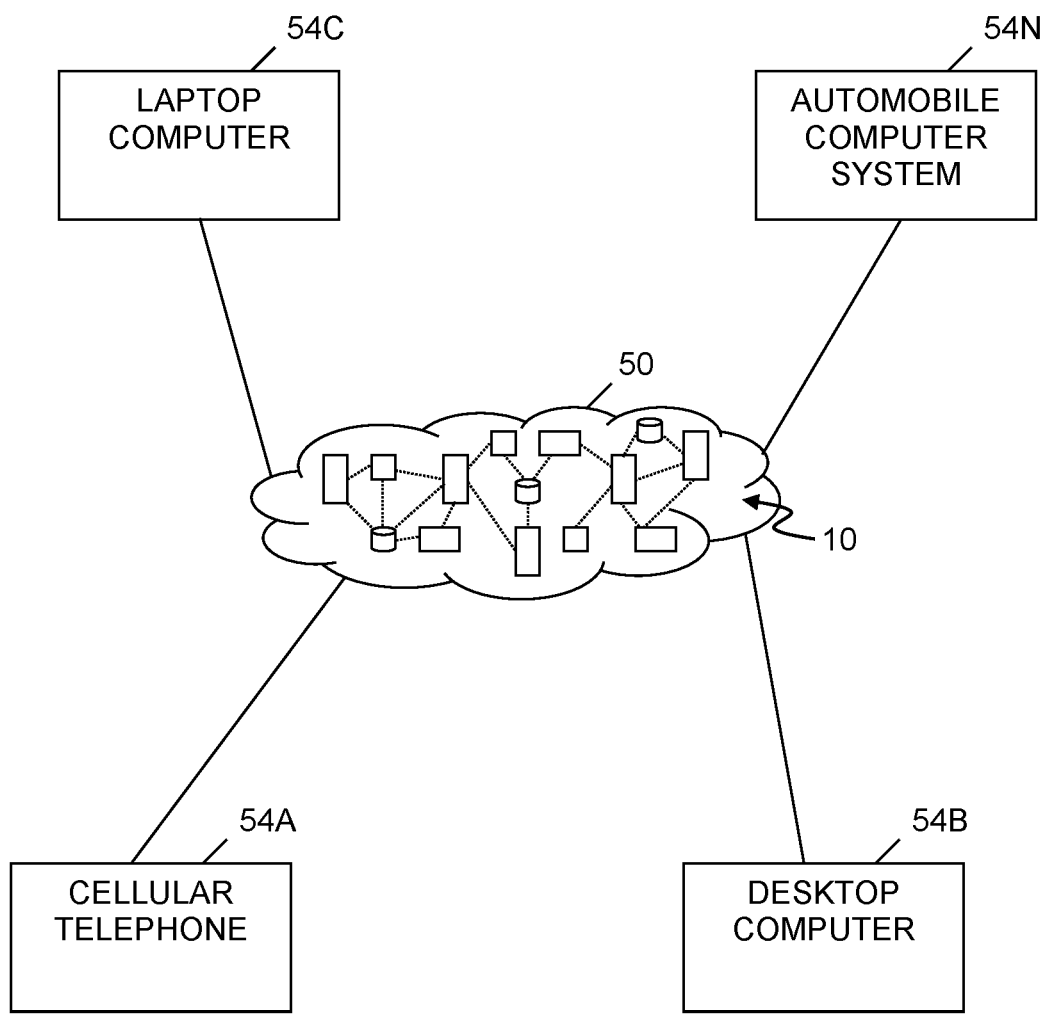
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
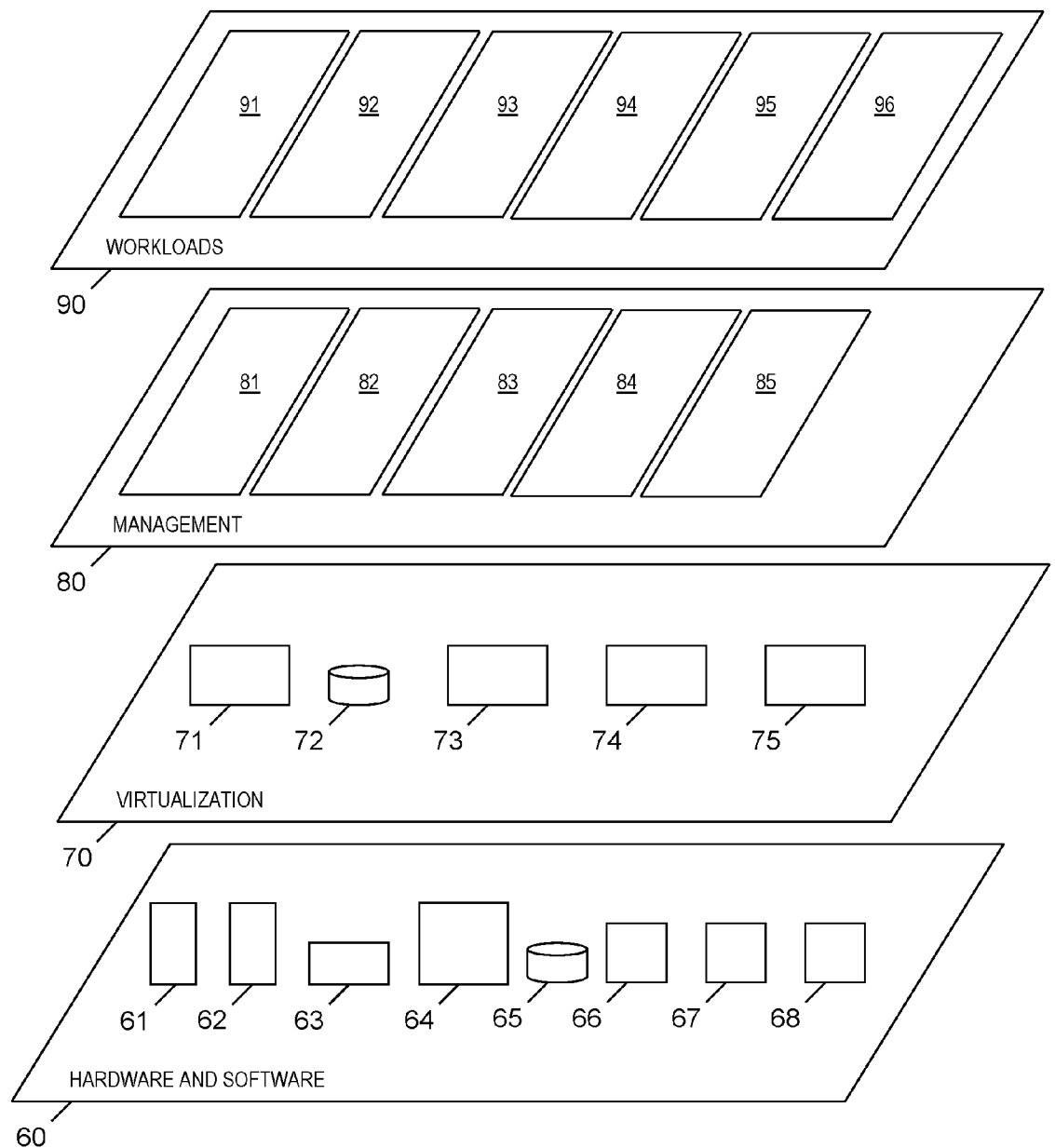
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimal event routing to solvers 120-1, . . . , 120-N (see FIG. 1) for event resolution 96.

What is claimed is:

1. A method of optimally routing events in an IT system to solvers which provide resolutions of the events, the method comprising the steps of:
a computer defining event streams originating from the IT system;
the computer classifying events into the event streams;
the computer solving an optimization problem that minimizes costs incurred for using respective solvers based on constraints which include success rates of the solvers;
based on the solved optimization problem, the computer defining policies that associate the event streams to the solvers in a many-to-one correspondence;
the computer, in real time, applying the defined policies to the event streams;
based on the applied policies and the classified events, the computer routing the events to respective solvers; and
the computer receiving an indication that the events are resolved by the respective solvers, which reduces downtime in the IT system,
wherein the step of solving the optimization problem includes the steps of:
the computer determining costs incurred for using the respective solvers;
the computer determining penalties incurred by a provider of the IT system in response to solvers not meeting service level objectives; and
the computer modeling an objective function based on the costs and the penalties.

2. The method of claim 1, wherein the step of determining the costs includes the step of obtaining information about the costs from an agreement by which a solver agrees to bill based on a number of events served and a number of time units for which the solver was in use.

3. The method of claim 1, wherein the step of determining the costs includes the step of obtaining information about the costs from an agreement by which a solver agrees to bill based on internal cost components that include a number of worker units that the solver employed to service an event stream and a quantum of management infrastructure that the solver expended to service an event stream.

4. The method of claim 1, wherein the step of determining the penalties includes obtaining information about penalties incurred by a provider of the IT system in response to solvers missing respective service level objectives.

5. The method of claim 1, wherein the step of solving the optimization problem includes the steps of:
generating a vector of unknown parameters for the objective function;
defining a domain for each of the unknown parameters;
generating a set of samples for the vector;
for the set of samples, computing a value of the objective function and determining whether constraints of the objective function are violated;
if the constraints are violated, discarding the sample as being infeasible, or if the constraints are not violated, keeping the sample as being feasible;
repeating the steps of generating the set of samples, computing the value, determining whether the constraints are violated, and discarding or keeping the sample; and
presenting the sets of samples that are feasible to a user; and
receiving a selection by the user of one of the sets of samples based on a Pareto analysis of the presented sets.

6. The method of claim 1, further comprising the step of:
providing at least one support service for at least one of creating, integrating, hosting, maintaining, and deploying computer-readable program code in the computer, the program code being executed by a processor of the computer to implement the steps of defining the event streams, classifying, solving, defining the policies, applying, routing, and receiving.

7. The method of claim 1, further comprising the step of:
providing software as a service in a cloud environment, the software being executed by a hardware processor in the cloud environment to implement the steps of defining the event streams, classifying, solving, defining the policies, applying, routing, and receiving.

8. A computer program product, comprising:
a computer-readable storage device; and
a computer-readable program code stored in the computer-readable, storage device, the computer-readable program code containing instructions that are executed by a central processing unit (CPU) of a computer system to implement a method of optimally routing events in an IT system to solvers which provide resolutions of the events, the method comprising the steps of:
the computer system defining event streams originating from the IT system;
the computer system classifying events into the event streams;
the computer system solving an optimization problem that minimizes costs incurred for using respective solvers based on constraints which include success rates of the solvers;
based on the solved optimization problem, the computer system defining policies that associate the event streams to the solvers in a many-to-one correspondence;
the computer system, in real time, applying the defined policies to the event streams;
based on the applied policies and the classified events, the computer system routing the events to respective solvers; and
the computer system receiving an indication that the events are resolved by the respective solvers, which reduces downtime in the IT system,
wherein the step of solving the optimization problem includes the steps of:

the computer system determining costs incurred for using the respective solvers;

the computer system determining penalties incurred by a provider of the IT system in response to solvers not meeting service level objectives; and the computer system modeling an objective function based on the costs and the penalties.

9. The computer program product of claim 8, wherein the step of determining the costs includes the step of obtaining information about the costs from an agreement by which a solver agrees to bill based on a number of events served and a number of time units for which the solver was in use.

10. The computer program product of claim 8, wherein the step of determining the costs includes the step of obtaining information about the costs from an agreement by which a solver agrees to bill based on internal cost components that include a number of worker units that the solver employed to service an event stream and a quantum of management infrastructure that the solver expended to service an event stream.

11. The computer program product of claim 8, wherein the step of determining the penalties includes obtaining information about penalties incurred by a provider of the IT system in response to solvers missing respective service level objectives.

12. The computer program product of claim 8, wherein the step of solving the optimization problem includes the steps of:

generating a vector of unknown parameters for the objective function;

defining a domain for each of the unknown parameters;

generating a set of samples for the vector;

for the set of samples, computing a value of the objective function and determining whether constraints of the objective function are violated;

if the constraints are violated, discarding the sample as being infeasible, or if the constraints are not violated, keeping the sample as being feasible;

repeating the steps of generating the set of samples, computing the value, determining whether the constraints are violated, and discarding or keeping the sample; and presenting the sets of samples that are feasible to a user; and receiving a selection by the user of one of the sets of samples based on a Pareto analysis of the presented sets.

13. A computer system comprising:

a central processing unit (CPU);

a memory coupled to the CPU; and a computer readable storage device coupled to the CPU, the storage device containing instructions that are executed by the CPU via the memory to implement a method of optimally routing events in an IT system to solvers which provide resolutions of the events, the method comprising the steps of:

the computer system defining event streams originating from the IT system;

the computer system classifying events into the event streams;

the computer system solving an optimization problem that minimizes costs incurred for using respective solvers based on constraints which include success rates of the solvers;

based on the solved optimization problem, the computer system defining policies that associate the event streams to the solvers in a many-to-one correspondence;

the computer system, in real time, applying the defined policies to the event streams;

based on the applied policies and the classified events, the computer system routing the events to respective solvers; and the computer system receiving an indication that the events are resolved by the respective solvers, which reduces downtime in the IT system, wherein the step of solving the optimization problem includes the steps of:

the computer system determining costs incurred for using the respective solvers;

the computer system determining penalties incurred by a provider of the IT system in response to solvers not meeting service level objectives; and the computer system modeling an objective function based on the costs and the penalties.

14. The computer system of claim 13, wherein the step of determining the costs includes the step of obtaining information about the costs from an agreement by which a solver agrees to bill based on a number of events served and a number of time units for which the solver was in use.

15. The computer system of claim 13, wherein the step of determining the costs includes the step of obtaining information about the costs from an agreement by which a solver agrees to bill based on internal cost components that include a number of worker units that the solver employed to service an event stream and a quantum of management infrastructure that the solver expended to service an event stream.

16. The computer system of claim 13, wherein the step of determining the penalties includes obtaining information about penalties incurred by a provider of the IT system in response to solvers missing respective service level objectives.

17. The computer system of claim 13, wherein the step of solving the optimization problem includes the steps of:

generating a vector of unknown parameters for the objective function;

defining a domain for each of the unknown parameters;

generating a set of samples for the vector;

for the set of samples, computing a value of the objective function and determining whether constraints of the objective function are violated;

if the constraints are violated, discarding the sample as being infeasible, or if the constraints are not violated, keeping the sample as being feasible;

repeating the steps of generating the set of samples, computing the value, determining whether the constraints are violated, and discarding or keeping the sample; and presenting the sets of samples that are feasible to a user; and receiving a selection by the user of one of the sets of samples based on a Pareto analysis of the presented sets.

* * * * *